July 29, 1924.

C. E. SARGENT 1,503,383

INTERNAL COMBUSTION ENGINE

Filed March 17, 1922    3 Sheets-Sheet 1

Inventor:
Charles E. Sargent,
By Dyrenforth, Lee, Chritton & Wiles,
Attys.

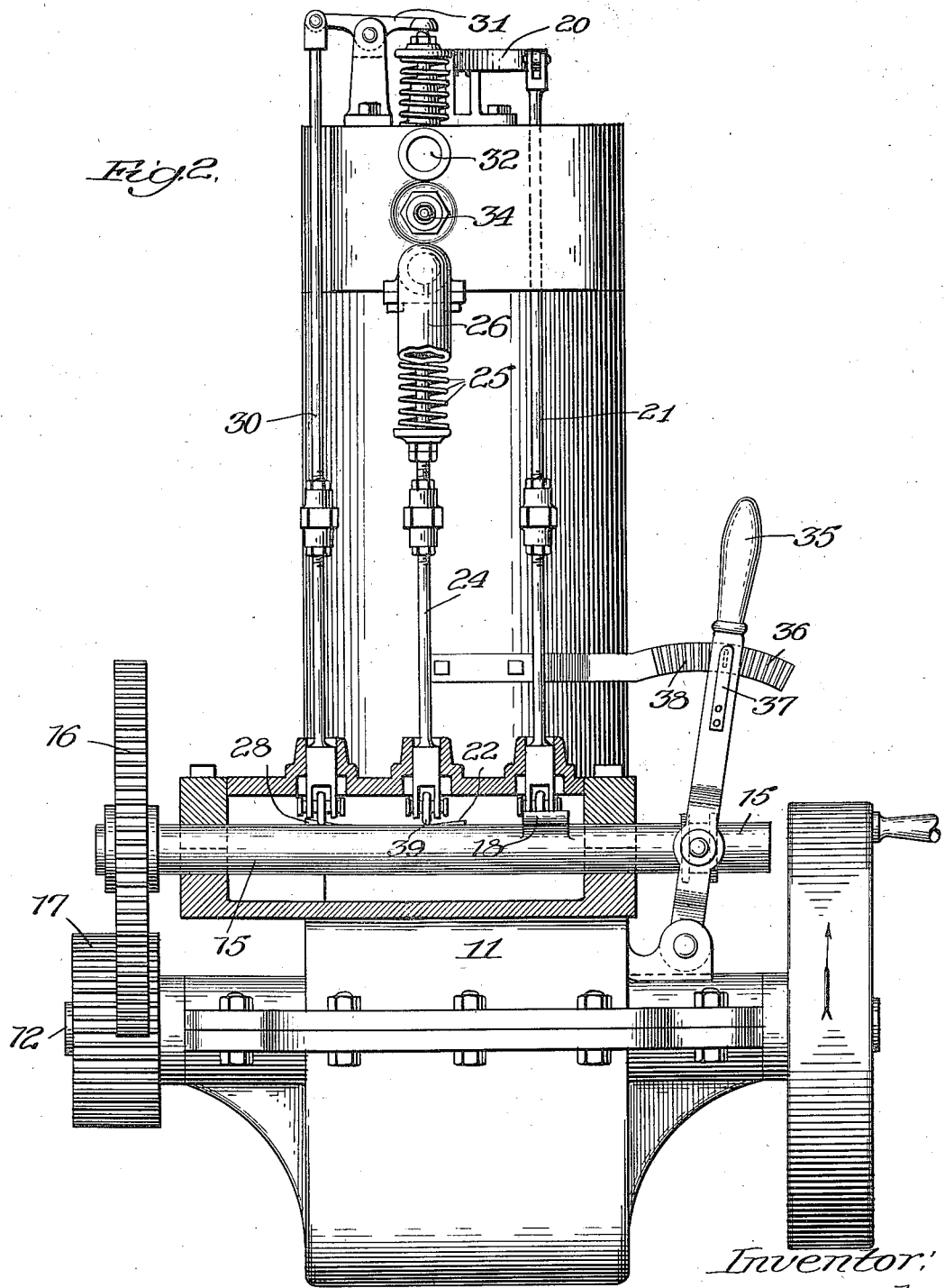

July 29, 1924.
C. E. SARGENT
INTERNAL COMBUSTION ENGINE
Filed March 17, 1922
1,503,383
3 Sheets-Sheet 3
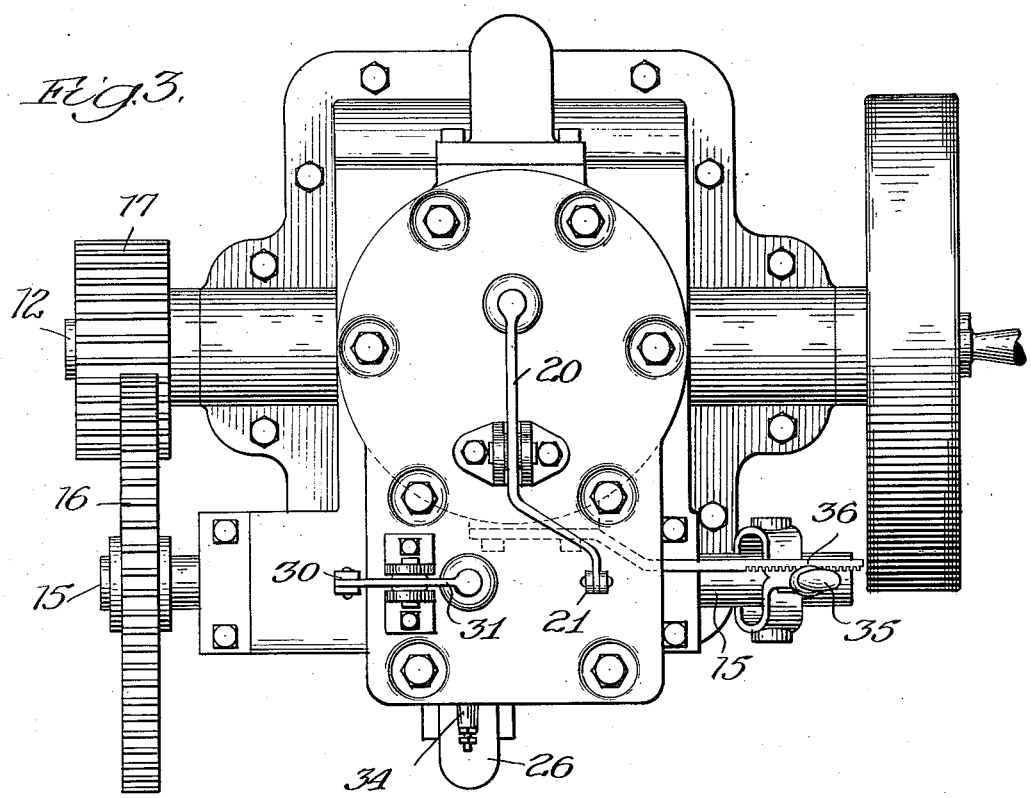
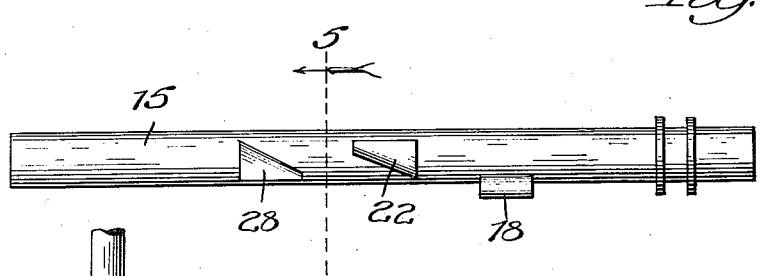
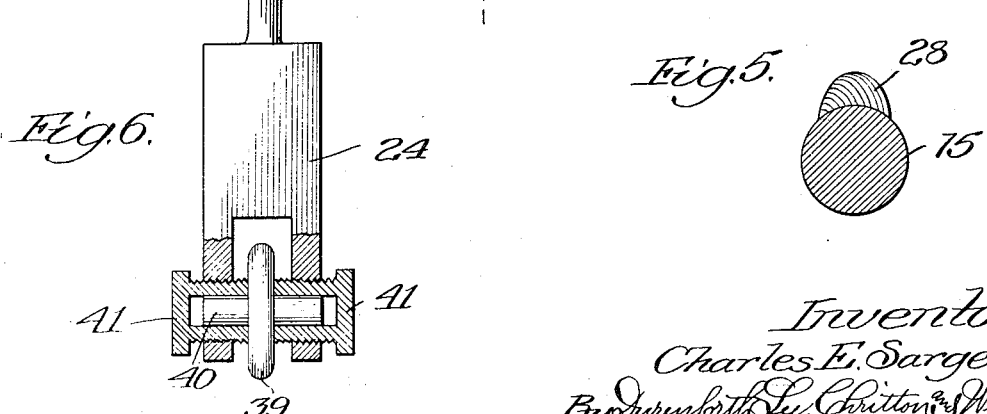
Inventor:
Charles E. Sargent,
By Dyrenforth, Lee, Chritton & Wiles,
Attys.

Patented July 29, 1924.

1,503,383

UNITED STATES PATENT OFFICE.

CHARLES E. SARGENT, OF ROCK ISLAND, ILLINOIS.

INTERNAL-COMBUSTION ENGINE.

Application filed March 17, 1922. Serial No. 544,452.

*To all whom it may concern:*

Be it known that I, CHARLES E. SARGENT, a citizen of the United States, residing at Rock Island, in the county of Rock Island and State of Illinois, have invented a new and useful Improvement in Internal-Combustion Engines, of which the following is a specification.

This invention relates to internal combustion engines and the like and is fully described in the following specification and shown in the accompanying drawings, in which—

Figure 2 is a side elevation of the same partially in section on the line 2, 2 of Fig. 1;

Figure 3 is a plan view of the same;

Figure 4 is an elevation of the cam-shaft;

Figure 5 is an enlarged section on the line 5 of Fig. 4; and

Figure 6 is an enlarged elevation partly in section of the lower end of the valve lift-rods.

Figure 1:
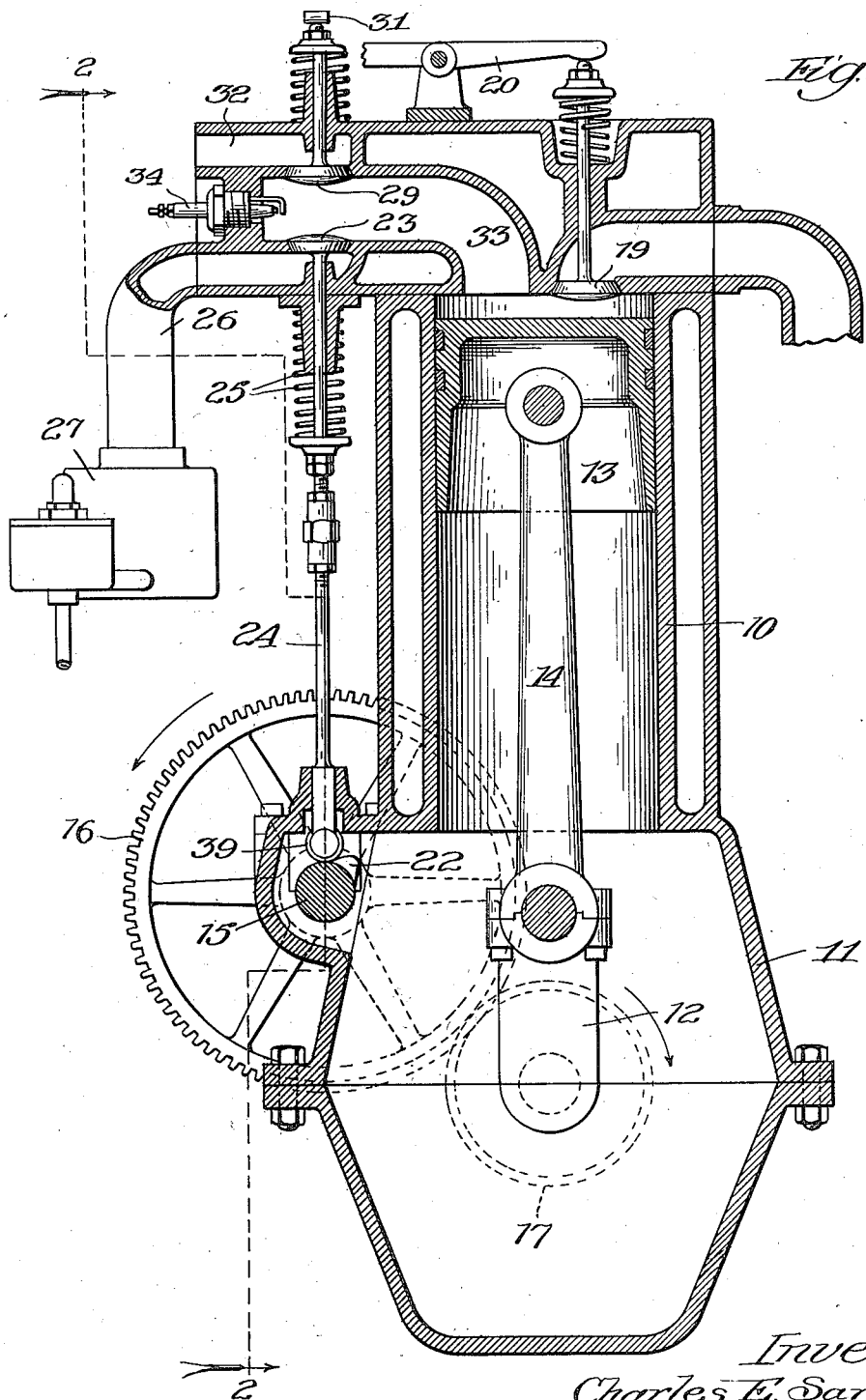
Figure 1 is a vertical transverse section through an internal combustion engine embodying the invention.

In the embodiment shown the engine comprises a cylinder 10 opening into a crank-case 11 in which is journalled a crank-shaft 12. The piston 13 is connected in the usual way to this crank-shaft by means of a connecting rod 14, so that the piston is slidable up and down in the cylinder 10.

A cam-shaft 15 is suitably journalled in the crank-case 11 and has a gear 16 keyed thereon which meshes with the gear 17 which is keyed to the crank-shaft 12, so that the cam-shaft makes one revolution for each two revolutions of the crank-shaft.

The cam-shaft 15 carries an exhaust cam 18 which operates the exhaust-valve 19 by means of the rocker-arm 20 and exhaust lift-rod 21 in a well known manner.

The cam-shaft 15 also carries a cam 22 which operates the "gas" or mixture inlet valve 23 by means of the valve tappet 24. This valve is normally held upon its seat in the usual manner by means of the spring 25. The mixture inlet pipe 26 is supplied with a substantially uniform combustible mixture of fuel and air by means of any suitable carbureter 27.

An additional air inlet cam 28 is carried by the cam-shaft 15 which serves to operate the air inlet valve 29 by means of a valve lift rod 30 and a rocker arm 31. Atmospheric air is supplied to the air valve 29 through the air passage 32. Both the air passing the air valve 29 and the combustible mixture passing the gas valve 23 are conveyed to the cylinder through the passage 33. A spark plug 34 or other suitable ignition means is preferably placed in this passage.

The cams 22 and 28 are reversely sloped as shown in Figs. 2 and 4 and the cam-shaft 15 is movable endwise by means of the shift lever 35 or it may be moved by a governor (not shown) to maintain a constant speed. Any suitable means may be employed for retaining this lever in adjusted position, such as the pin 36 which is pressed by the spring 37 against the notched quadrant 38.

The operation of this engine is as follows: With the parts set as shown in Fig. 2, as the exhaust cam 18 passes the exhaust lift rod 21 thereby closing the exhaust valve 19, the air cam 28 during less than full load lifts the air valve 29 off its seat thereby admitting a charge of air to the cylinder, at the same time cooling the inlet passage 33 and sweeping it clean of exhaust gases.

While the air valve 29 is still open but has started to close, the gas valve 23 is opened by the cam 22 and a combustible mixture is drawn through the pipe 26 into the passage 33. The air valve 29 then closes in advance of the closing of the gas valve 23 so that the passage 33 remains filled with a combustible mixture. The charge is then compressed and is fired by the spark plug 34. Owing to the form of the passage or "pocket" 33 the last of the combustible mixture to pass the gas valve 23 remains in this pocket and is compressed thereby insuring a thorough ignition of the charge no matter how small the proportion of combustible mixture to the total volume of air and mixture received in the cylinder.

By this arrangement the total amount of air and combustible mixture passing the two valves 23 and 29 always remain substantially constant so that the initial compression of the engine remains nearly constant for all conditions of operation and loads.

It will also be observed that the advance face of the air cam 28 is a straight line parallel to the shaft 15 so that the air valve 29 always opens at substantially the same point, and that the amount of air entering the cylinder through this valve is controlled by the height to which the valve is opened and the point at which it closes. The gas cam 22 on the other hand opens at varying times depending upon the longitudinal position of the cam-shaft 15 but always closes at the same time as the closing line of this cam is a straight line parallel to the shaft 15 as shown in Fig. 4 and so arranged or proportioned that the gas valve closes approximately ⅔ of the induction stroke making the working stroke 50% longer than the compression stroke, thereby providing for a much more complete expansion of the charge.

The cam-shaft as shown in Fig. 2 is set for operation on light load, as a very large proportion of air is being admitted by the air cam 28 and only a small proportion of combustible mixture is admitted by the gas cam 22. As the lever 35 is moved to the left as the load increases the proportion of air will decrease and the proportion of combustible mixture will increase until a point is reached where no air is admitted by the air valve 29 and the engine is running entirely upon the combustible mixture passing through the tube 26. It will be observed that the exhaust cam 18 is of a uniform contour throughout.

I have provided a means for varying the opening of one admission valve with respect to the other which consists as shown in Fig. 6 in providing a cam follower roller 39 with a shaft 40 which is journalled at each end in a threaded member 41 which is screwed into the lower end of the valve tappet 24. By screwing the members 41 to the right or to the left the position of the roller 39 is changed with relation to the corresponding roller on the other inclined cam, thereby bringing about a corresponding change in the relative timing of the air and gas inlet valves.

A high degree of thermal efficiency through the whole range of loads is obtained by this engine due to the fact that on light loads, the same degree of compression is maintained as on full loads and to the fact that stratification of the charge with the air largely at the bottom and a rich mixture in the pocket surrounding the spark plug, insures a complete combustion of all fuel in the cylinder, even to that portion at the bottom of the cylinder which due to its mixture with a large proportion of air, could not ordinarily be ignited by a spark. The mechanical efficiency is also increased due to the lack of rarefaction on the suction stroke which is present in the throttling type of engine on less than full load.

It will thus be seen that control of the speed of the engine is obtained by varying the amount of fuel fed while the volume of fluid admitted for each charge remains substantially constant.

While I have shown and described but a single embodiment of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:

1. In an internal combustion engine, a cylinder, a piston movable therein, means for admitting air only to the cylinder during the first part of the suction stroke, and for admitting a combustible mixture only during the last part of said stroke, said means including a pocket into which said combustible mixture passes and means in said pocket for igniting said mixture.

2. In an internal combustion engine, a cylinder, a piston movable therein, an air valve for admitting air to said cylinder, a gas valve for admitting a combustible mixture to said cylinder, and means for operating said air and gas valves to vary the proportion of combustible mixture and air delivered to the cylinder.

3. In an internal combustion engine, a cylinder, a piston movable therein, an air valve for admitting air to said cylinder, a gas valve for admitting a combustible mixture to said cylinder, and a cam-shaft driven by said engine and having variable faced cams for operating said valves, said shaft being slidable endwise to vary the operation of said valves to control the operation of said engine.

4. In an internal combustion engine, a cylinder, a piston movable therein, an air valve for admitting air to said cylinder, a gas valve for admitting a combustible mixture to said cylinder, and a cam-shaft driven by said engine and having variable faced cams for operating said valves, said shaft being slidable endwise to vary the operation of said valves to control the operation of said engine, said valves deliverying into a single pocket adjacent to the cylinder.

5. In an internal combustion engine, a cylinder, a piston movable therein, an air valve for admitting air to said cylinder, a gas valve for admitting a combustible mixture to said cylinder, a cam-shaft driven by said engine and having variable faced cams for operating said valves, said shaft being slidable endwise to vary the operation of said valves to control the operation of said engine, said valves delivering into a single pocket adjacent to the cylinder, and means in said pocket for igniting the combustible mixture.

6. In an internal combustion engine, a cylinder, a piston movable therein, an air valve for admitting air to said cylinder, a gas valve for admitting a combustible mixture to said cylinder, a cam-shaft driven by said engine and having variable faced cams for operating said valves, said shaft being slidable endwise to vary the operation of said valves to control the operation of said engine, said valves delivering into a single pocket between said valves and cylinder, said gas valve always closing after the air valve, and means in said pocket for igniting the combustible mixture.

7. In an internal combustion engine, a cylinder, a piston movable therein, an air valve for admitting air to said cylinder, a gas valve for admitting a combustible mixture to said cylinder, means for operating said valves to vary the proportion of combustible mixture and air delivered to the cylinder, and means for varying the relation of each valve to said valve operating means to vary the proportions of said mixture and air.

8. In an internal combustion engine, a cylinder, a piston movable therein, an air valve for admitting air to said cylinder, a gas valve for admitting a combustible mixture to said cylinder, means for operating said valves to vary the proportion of combustible mixture and air delivered to the cylinder, and means for varying the relation of one of said valves to said valve operating means to vary the proportions of said mixture and air.

9. In an internal combustion engine, a cylinder, a piston movable therein, an air valve for admitting air to said cylinder, a gas valve for admitting a combustible mixture to said cylinder, a cam-shaft driven by said engine, having an air inlet cam so cut that the air valve will always start to open at the same place with relation to the position of the piston for all loads, and the gas valve will always close at the same place with relation to the position of the piston, and as the air valve begins to close, the gas-valve begins to open, the point of said movements depending on the longitudinal position of the cam-shaft.

10. In an internal combustion engine, a cylinder, a piston movable therein, an air valve for admitting air to the cylinder, and a gas valve for admitting gas to the cylinder, an ignition device therein, means for causing said air valve to admit air only at the first part of the suction stroke and for causing the gas valve to admit a combustible mixture only at the latter part of the stroke, when the engine has less than full load, and means for varying the point where the air valve closes and the gas valve opens, to maintain a uniform speed with variable load and means for holding the gas mixture going in last, adjacent to the ignition device.

CHARLES E. SARGENT.